Feb. 17, 1925. 1,526,493
J. H. DOLTON
REVERSING AND NONREVERSING VARIABLE SPEED TRANSMISSION GEAR
Filed Oct. 3, 1921 3 Sheets-Sheet 1
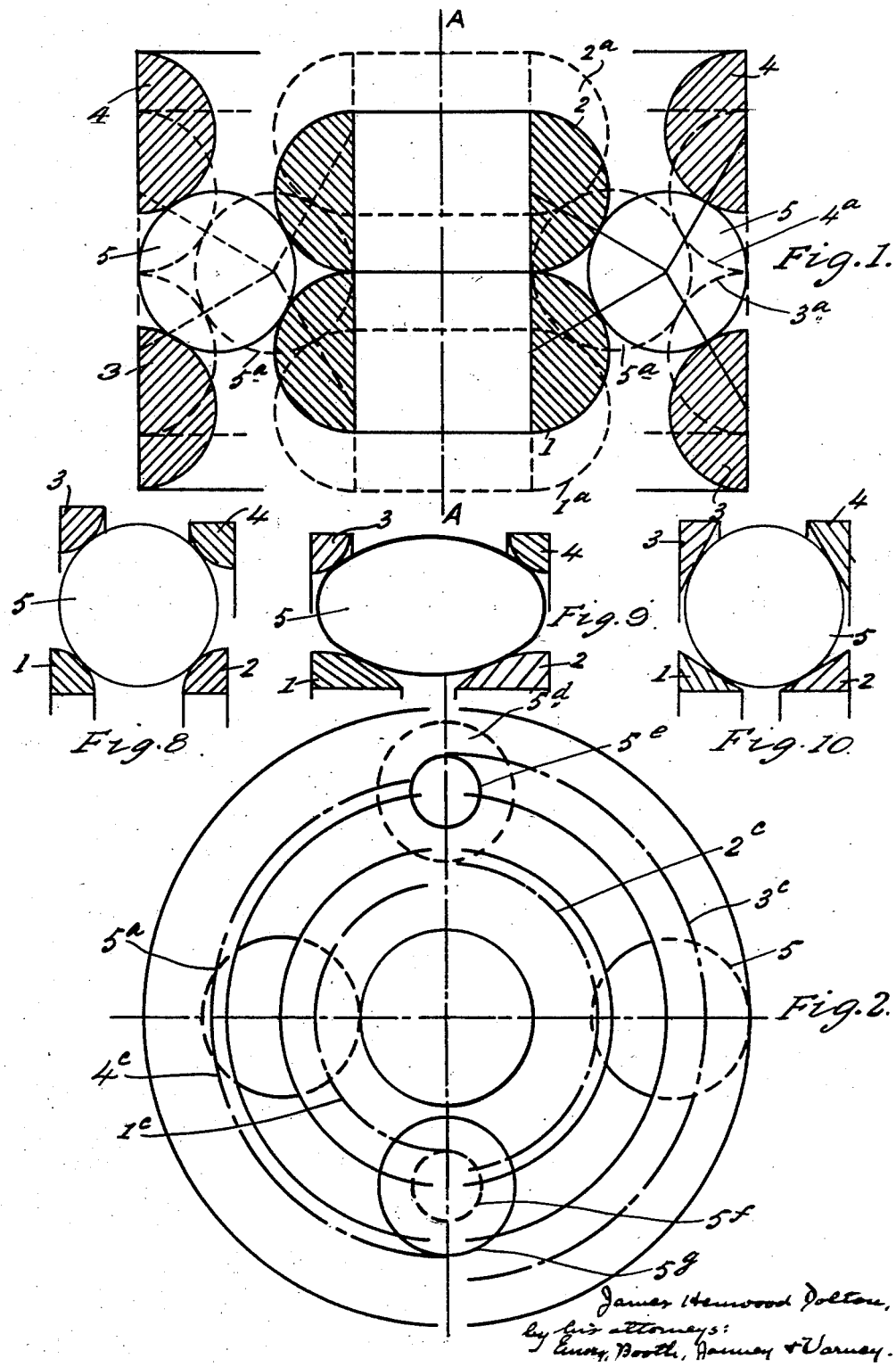

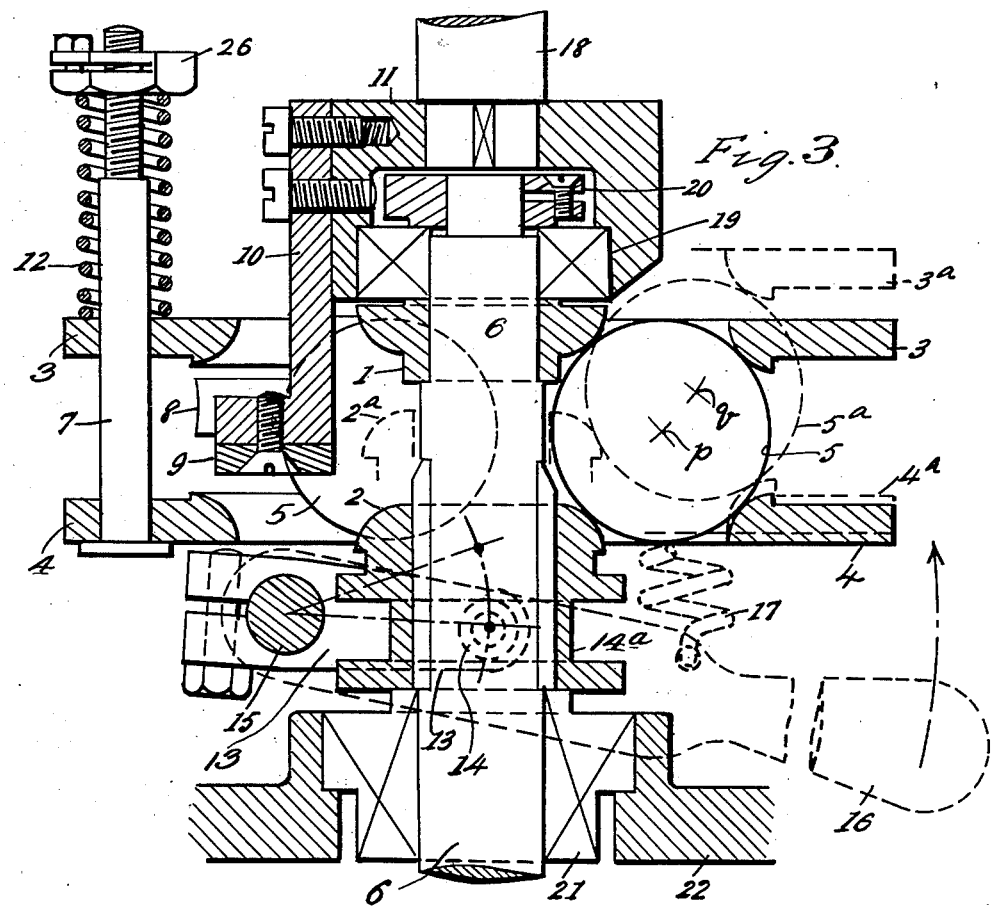

Feb. 17, 1925.  
J. H. DOLTON  
1,526,493
REVERSING AND NONREVERSING VARIABLE SPEED TRANSMISSION GEAR
Filed Oct. 3, 1921    3 Sheets-Sheet 3
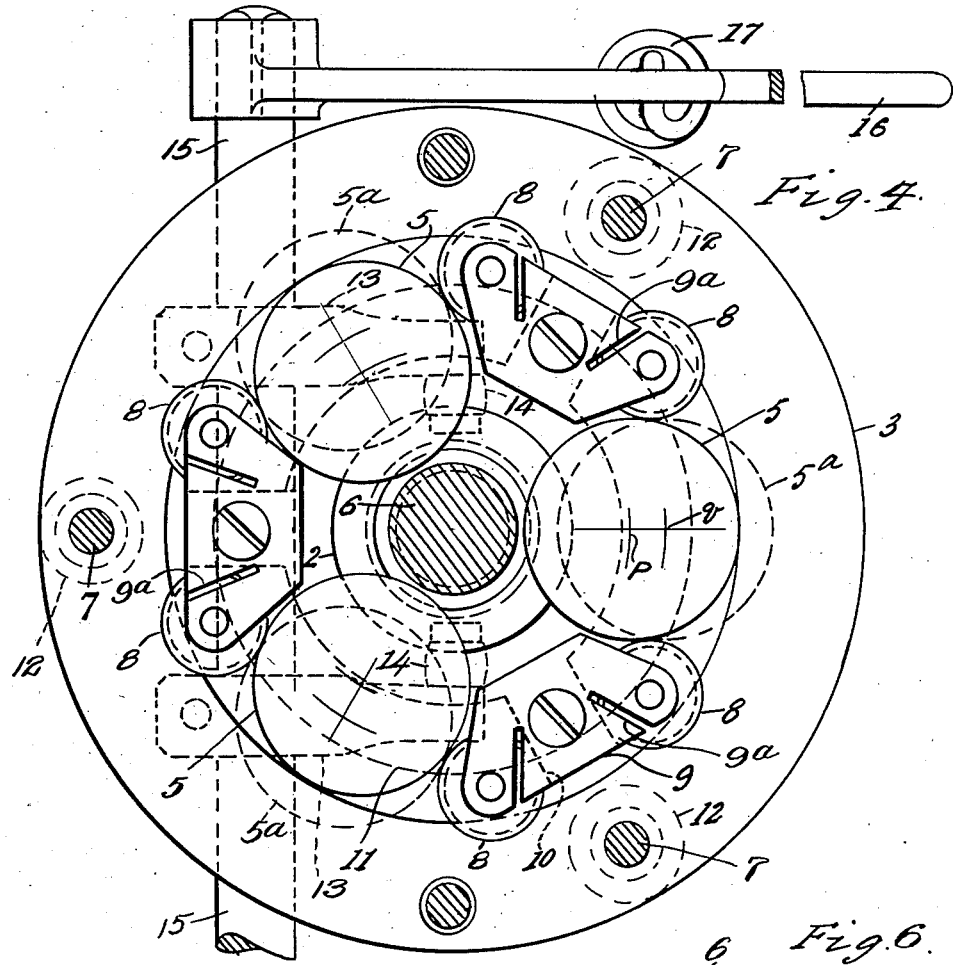
Fig. 4.
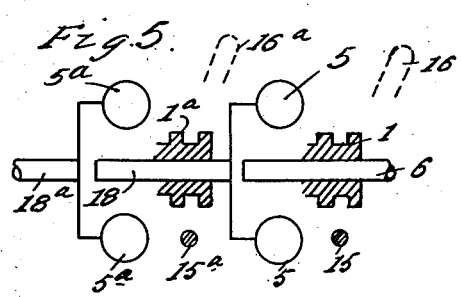
Fig. 5.
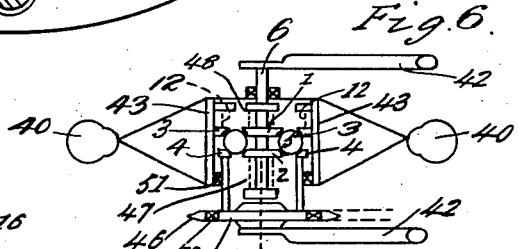
Fig. 6.
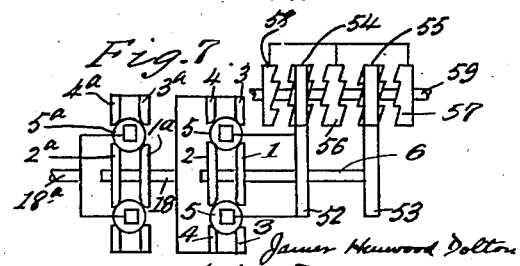
Fig. 7.

Patented Feb. 17, 1925.

1,526,493

UNITED STATES PATENT OFFICE.

JAMES HENWOOD DOLTON, OF LONDON, ENGLAND.

REVERSING AND NONREVERSING VARIABLE-SPEED-TRANSMISSION GEAR.

Application filed October 3, 1921. Serial No. 504,889.

*To all whom it may concern:*

Be it known that I, JAMES HENWOOD DOLTON, a subject of the King of Great Britain, residing in London, England, have invented certain new and useful Improvements in and Relating to Reversing and Nonreversing Variable-Speed-Transmission Gears, of which the following is a specification.

The invention relates to apparatus used for the mechanical transmission of rotation whereby the speed of such rotation can be varied in any degree between predetermined limits, and whereby such variations may be obtained without any interruption of the rotation transmitted, and further, to variable speed transmission systems whereby a reversal in direction of transmitted rotation is obtainable.

By the present invention a variable speed transmission system is provided of the type employing contacting members arranged concentrically about a common axis and comprising three elements viz:—a member rotating at the imparted rate; an intermediate member; and a third member rotating at the induced rate to be transmitted to the objective, the arrangement of the three elements being the well known sun and planet form generally associated with internal tooth gearing. Hitherto apparatus embodying transmission members for rotary motion relying upon contacting surfaces under pressure have only been partially successful in that they are only adaptable to the transmission of light loads because the necessary heavier pressure to transmit greater power without slip between the contacting surfaces overcomes the resistance to grinding and wear and renders such apparatus inoperative for high power transmission.

The amount of power which may be transmitted by the present transmission system depends entirely upon the pressure applied to the contact points; and there being no limit to this pressure, as however great it is grinding will not result, for transmission of large powers it will merely be necessary so to proportion the various members that they adequately resist the stresses set up.

Further description is made with reference to the accompanying drawings in which:—

Figs. 1 and 2 are diagrams illustrating the essential elements of the invention and the action thereof.

Fig. 3 is a longitudinal section of a form of construction of a gear unit.

Fig. 4 is a cross section of the same.

Fig. 5 is a diagram of a method of employing two complete units.

Fig. 6 is a diagram of an application to a road wheel hub.

Fig. 7 is a diagram of a method of obtaining reversals of rotation.

Fig. 8 is a diagram of a method of dividing the unit.

Figs. 9 and 10 are two alternative forms of essential elements.

Referring more specifically to the illustrative embodiment of the invention shown in the drawings, Fig. 1 shows annular rings 1 and 2 having curved outer surfaces forming tracks which are capable of rotation about the axis AA, and annular rings 3 and 4 having curved inner surfaces forming tracks concentric with the rings 1 and 2 which are non-rotatable about the axis AA.

Contacting with these rings on their aforesaid surfaces are satellite members 5. and rotation of the inner pair of rings 1 and 2 will cause a planetary rotation of the satellites through a circular orbit enclosed by the four rings.

Lateral displacement of the rings 1 and 2 to the positions $1^a$ and $2^a$, and displacement of the rings 3 and 4 to the positions $3^a$ and $4^a$ reduces the orbit of the satellites to a marked degree, viz, to $5^a$. It will be noted that the contact points between the satellites and the rings have undergone a radical change.

Referring to Fig. 2 the satellite is shown in its greatest orbit at 5, and in its smallest orbit at $5^a$; $2^c$ and $3^c$ are the greatest contact orbits and $1^c$ and $4^c$ are the smallest contact orbits; $5^d$ and $5^e$ are the greatest contact zones on the satellites, and $5^f$ and $5^g$ are the smallest contact zones on the satellites. Ignoring slip, which is hereinafter provided for, the arrangement is to be considered as a planetary gear in which the magnitude of pitch circles corresponds to the circles of contact, and these being variable between the greatest and smallest as indicated, a variable gear ratio is the result of the lateral displacements of the rings 1, 2, 3 and 4. In the case under consideration the outer rings are non-rotatable and therefore the satellites will rotate planetarily at a rate controlled by the aforesaid lateral displacements. There are therefore in the unit described three essential elements, viz, a pair of inner rings having contact surfaces, a pair of outer rings having contact surfaces and one or more satellite members rotating between the inner and outer pairs of rings.

Any one of the three elements may be the driver and either of the remaining two the driven, while the third will be the restrained or controlled element. Accordingly there are six alternative combinations of the functions of the elements in which the results are relatively identical, and these alternatives are to be considered applicable to the hereinafter detailed descriptions.

In Figs. 3 and 4 a form of construction is arranged in which 1 and 2 are inner rings rotated by spindle 6. Outer rings 3 and 4 are restrained from rotation by rods 7 located in the casing (not shown). The ring 1 is rigidly attached to the spindle 6 and ring 2 is slidably mounted thereon in a manner that, while ring 1 rotates without lateral movement, ring 2 may be moved laterally during rotation by the lever 16 operating through rocking shaft 15, the arms 13 and rollers 14 working in a grooved extension of the ring 2. Three satellite spheres 5 planetarily rotate between pairs of rings 1 and 2, and 3 and 4, the latter pair being subject to the pressure springs 12. Cage 11 with stems 10 and supporting plates 9, carries rollers 8 which retain spheres 5 in angular relationship. Free rotation between spindle 6 and cage 11 is obtained by ball bearing 19 locked in position by locknut 20. Cage 11 is rigidly attached to spindle 18. The casing 22 contains a ball bearing 21 supporting spindle 6.

Rotation imparted to spindle 6 from any source will be converted to planetary rotation of spheres 5 and transmitted by means of cage 11 to spindle 18 at a reduced rate. Without interruption of rotation the ring 2 may be advanced to position 2$^a$, a stop (not shown) in the path of lever 16 preventing movement beyond the required limit. Such advance of ring 2 to position 2$^a$ will cause sphere 5 to move to 5$^a$ and rings 3 and 4 to take up positions 3$^a$ and 4$^a$ respectively.

Although only inner ring 2 has been moved laterally by the lever 16 the relative change in disposition of the three elements is exactly similar to that described in reference to Figs. 1 and 2 and it is immaterial whether one only or both of a pair of rings are operated upon by the lateral displacement means.

During the displacement the orbit has expanded and shifted its plane centre from $p$ (Fig. 3) to $q$, and the combination of a radial expansion with a lateral plane shift affects the form of the rollers 8 which are suitably shaped on their outer surfaces to prevent loss of contact with the spheres 5 in the shifting plane of rotation. As the distances from the sphere surfaces to the roller centres are greatest at the limits of lateral movement the result is that a concave form is given to the outer surfaces of the rollers 8. Gashes may be made in supporting plate 9 to accommodate any small inaccuracy in the concavity of the rollers to allow the centres of the rollers 8 to give a little when required.

The cage 11 and the suitably supported rollers 8 having curved working surfaces are merely accessories to the essential elements hereinbefore described in reference to Figs. 1 and 2.

The function of the springs 12 is to provide and maintain a compression stress at the contact points between rings 1, 2, 3 and 4 and the spheres 5, to prevent slip during rotation. This stress is usually required to be less than 0.01 per cent of the torque pressure transmitted at the orbit radius per pair of contact points. This equals 0.02 per cent per spring in the construction according to Figs. 3 and 4.

An increase of speed transmitted reduces the pressure necessary to prevent slip and the springs 12 Figs. 6 and 7 are arranged to be at their maximum compression on the slowest transmitted speed.

A spring 17 (Fig. 3) is conveniently arranged and adapted to minimize, balance or overpower the effect of springs 12 upon the sliding means operating on ring 2 so that the resistance to the lateral displacements is not felt on the lever 16 in conditions where such effect is required.

It will readily be seen that other forms could replace the springs 12 such as compression springs suitably arranged on spindle 6 and acting on rings 1 and 2 and the lateral displacements effected on rings 3 and 4 instead of being arranged to operate only on ring 2.

Fig. 5 is a skeleton diagram illustrating a method of employing two complete variable speed transmission units each arranged in detail exactly as illustrated in Figs. 3 and 4 to which reference is to made in the following description.

Referring to Fig. 5 rotation of the spindle 6 is transmitted to spindle 18 in a variable ratio according to position of lever 16, and is further transmitted to spindle 18$^a$ in a further variable ratio according to the position of lever 16ᵃ, and the total ratio of rotation of spindle 18ᵃ relative to spindle 6 is obtained by multiplying the two ratios, i. e. of each unit, together. Thus for two identical units with limiting ratios of 2:1 and 4:1 each the total limiting ratios will be 4:1 and 16:1 and for three such units 8:1 and 64:1 and so on. It is immaterial whether levers 16 and 16ᵃ are operated simultaneously or separately, the total limiting ratios are unaltered. Conditions extraneous to the transmission system generally influence the choice of operating method and any combination or selection of method is permissible when two or more units are employed in one transmission system.

Moreover when a multiple of units is employed in one system any of the forms hereinbefore described may be introduced and the units may also vary in dimensional qualities in the essential elements from each other, for example a system consisting of two units of similar form but of different dimensional qualities may be so combined and arranged that a wide range of ratios between limits could be obtained from one unit with fine additions and deductions of ratio from the other. Another typical example is a system consisting of two units of opposite forms of similar dimensional qualities having identical ratio limits as each other, but inverted. Such a combination would give an average ratio of 1:1 with addition or deduction relative to the imparted rotation as desired.

It is therefore permissible to use the units in any number, form or size in-combination in one variable transmission system and to operate the sliding means of each unit singly or in combination with the sliding means of the other units in the system in any order or group as desired.

Fig. 6 is a diagram illustrating an application of a variable speed transmission unit to a wheel hub. The form chosen is an example of the device of "dividing the unit" Fig. 8 to which reference is made in the following description. A bicycle driving wheel 40 is supported in fork stems 42 carrying a stationary stem 6 upon which are slidably mounted inner rings 1 and 2. Hub barrel 43 contains one outer ring 3 slidably mounted. Driving sprocket 46 with free wheel 50 rotates outer ring 4 which is not slidable. Spheres 5 are contained in a cage (not shown) not mechanically connected with any other member. Lateral displacements are obtained by means of Bowden wire 49 operating on inner ring 2 against compression spring 47. Inner ring 1 follows inner ring 2 being pressed onwards by spring 48. Ring 4 not being laterally movable, ring 3 moves under control of spring 12 to accommodate the radial and lateral displacements of spheres 5. Rotation of sprocket 46 rotates ring 4 and spheres 5 planetarily rotating about rings 1 and 2 transmit rotation to ring 3 which drives the hub 43. From Fig. 8 it will be seen that there are dimensional differences in rings 3 and 4 of such a nature that when a lateral displacement takes place as described the ratio of rotation between rings 3 and 4 will vary to the desired extent. Other differences between the pairs of rings chosen for division may be used, for example the one could be concave and the other flat as that of ring 4 in Fig. 10, or both flat of different angles, or concave and convex or both concave of different amplitudes. Any difference, whether of form or radius is permissible. Units devised in a nonsymmetrical manner, as is necessary in the foregoing device of "dividing the unit", are suitable only for transmitting small powers, and the conditions calling for such method of transmission are better met, when the space available is not too limited by employing two opposing units in the manner described in reference to the alternatives to Fig. 5.

Fig. 7 is a diagram illustrating a method of obtaining reversal of direction of transmitted rotation. Two units are indicated and reversal of rotation transmitted to spindle 18ᵃ is obtained by alternately imparting the driving rotation to, or restraining from rotation, the inner rings 1 and 2, and the spheres 5. On a spindle 59 is mounted a series of clutches of any known form in which 54 and 55 are free on the spindle and geared with pinions 52 and 53 respectively, 56 slidably mounted rotates with the spindle 59, and 57 and 58 are slidably mounted but are not rotatable. Clutch members 56, 57 and 58 slide in unison, operated by any suitable means. It will be seen that when members 54 and 55 are in engagement with 56 and 57 respectively, the spheres 5 will rotate and the rings 1 and 2 will remain stationary; and when members 54 and 55 are in engagement with 58 and 56 respectively, the rings 1 and 2 will rotate and the spheres 5 will not rotate planetarily when the spindle 59 is rotated. This alternation of function of the two elements of spheres 5 and rings 1 and 2 results in a reversal of rotation transmitted to spindle 18 through the outer rings 3 and 4. A second unit or more may be added and the rotation transmitted to 18 may be further transmitted to spindle 18ᵃ or its equivalent in the final unit embodied. It is to be noted that alternating the function of the two elements as described inverts the ratio of speed rate so that the rate of rotation transmitted in one direction is not identical with the rate in the other, for example a 2:1 reduction becomes a 1:2 increase in the alternate condition, so that a speed on the spindle 59 of 100 R. P. M.

is transmitted to spindle 18 at 50 R. P. M. in the first condition and at 200 R. P. M. in the second condition. In a system employing a multiple of units alternation of the function of two elements need only be introduced into any one unit for the purpose of reversing the transmitted rotation.

Figs. 9 and 10 are illustrations of alternative forms of essential elements. Other forms readily suggest themselves, and any suitable forms are permissible provided that the satellites 5 are symmetrical in a continuous curve each side longitudinally and circular in every cross section, and except where the device of "dividing the unit" is employed as hereinbefore described in reference to Figs. 6 and 8 where spherical satellites only are to be employed, provided that the outer and inner rings are dimensionally identical in radius and form of contact zone or track in pairs, i. e. difference in form of contact zone or track may occur in reference to inner and outer rings, but the form is to be identical in each of the pair of outer, and each of the pair of inner rings, and that in the complete arrangement of satellites and rings there are four contact points for each satellite symmetrically arranged about the plane perpendicular to the satellite rolling axis.

It will be noted that various deviations from the arrangements of elements in a variable transmission unit as hereinbefore described may be constructed. For example, in the arrangement illustrated in Figs. 3 and 4, the outer rings 3 and 4 instead of being restrained from rotation by rods 7 may be arranged to be contained in a drum or rim (not shown) capable of being rotated in a direction opposite to the rotation imparted to the inner rings 1 and 2, at a constant rate equivalent to the mean of the ratio limits of the unit as illustrated in Figs. 3 and 4, multiplied into the rate imparted to the inner rings 1 and 2. At the mean lateral displacement such an arrangement will be in equilibrium and the spindle 8 will rotate at zero R. P. M. or "float" in a state of rest. Any displacement either side of the mean will result in positive rotation of the spindle 18 in one direction or the other according to which side of the mean the displacement has progressed. The drum or rim containing rings 3 and 4 may be driven at the required constant rate by suitable "back gearing" or any suitable known means from the spindle 6, or in any suitable manner. By suitably choosing the point at which lateral displacement produces equilibrium or zero rate of rotation of the spindle 18 with reference to the speed of rotation of rings 3 and 4, the unit will be arranged to give a greater rate of reduction on one side of zero rate than on the other and opposite direction side. This arrangement is suitable for a motor car drive as the automatic zero gives a "free engine" position with the clutch still in.

A wider range of operation each side of zero, or on one side only of zero as desired may be obtained by the member rotating the rim containing the rings 3 and 4 being a gear meshing with teeth on the aforesaid rim, and equipping such member with a complete variable transmission unit so that the rotation of the rings 3 and 4 will be variable according to the displacements of the elements of the units in the gear driving the containing rim.

Generally, the construction and arrangement of the apparatus supplying the rotation to be variably transmitted and the objective to which it is to be so transmitted will decide the particular form or forms to be chosen for the transmission unit or units to be employed or embodied, and the examples hereinbefore described are typical only and any application employing transmission units containing the essential elements and accessories hereinbefore described in any alternative form, singly or in combination with each other or with any known mechanism is deemed to be within the scope of this invention.

It will be understood that the variable speed transmission system hereinbefore described may be applied to a variety of purposes. For example it may be employed with any kind of machine tool having a rotating cutter or means for rotating the object to be cut, such as drills and lathes. Or it may be employed in connection with motor vehicles and engines or motors of various kinds, in fact it may be employed in any cases where a variation of speed between driving and driven members is desired.

Having thus described the nature of my said invention and the best means I know of carrying the same into practical effect I claim:—

1. A variable speed transmission system comprising, in combination, two or more connected variable speed transmission units; each unit comprising an inner rotatable ring, an outer coaxial stationary ring, satellites interposed between the rings, and means connected with the satellites to be rotated thereby or to impart rotation thereto, as the case may be; and means connected with both the inner ring and the satellites of one of said units and capable of imparting rotation selectively either to the said inner ring or to said satellites to vary at will the rotation of the shaft driven by the system as a whole.

2. In a variable speed transmission, the combination of two shafts in axial alinement, a ring rotatable by and slidable on one of the shafts, a plurality of outer rings coaxial with said shaft and held against rotation, both said outer rings being movable longitudinal of the shafts, satellites interposed between the outer rings and inner ring, means including a spring for constraining said outer rings to approach each other and to maintain engagement with the satellites, an operating means for sliding said inner ring, and a spring urging said operating means to move the inner ring into engagement with the satellites.

3. A variable speed transmission comprising, in combination, a driving shaft; a driven shaft; relatively movable rings arranged coaxially in outer and inner pairs and providing tracks; a plurality of satellite members interposed between the rings; and a cage fast to one of said shafts for transmitting thereto the rotation of the satellite members; said cage having stems each extending between two of the satellites and carrying a pair of rollers each in contact with one of the satellites; said cage being constructed and arranged to permit small lateral movements of said stems and of the rollers thereon.

4. A variable speed transmission comprising, in combination, a driving shaft; a driven shaft; relatively movable rings arranged coaxially in outer and inner pairs and providing tracks; a plurality of satellite members interposed between the rings; and a cage fast to one of said shafts for transmitting thereto the rotation of the satellite members; said cage having stems each extending between two of the satellites and carrying a pair of rollers each in contact with one of the satellites; said cage having a resilient plate supporting said stems; and gashes cut in the plate to permit independent small lateral movements of each stem and hence of the roller carried thereby.

In testimony whereof I have signed my name to this specification.

JAMES HENWOOD DOLTON.